United States Patent [19]
Neuner et al.

[11] Patent Number: 5,925,579
[45] Date of Patent: Jul. 20, 1999

[54] REINFORCEMENT OF STRUCTURES IN HIGH MOISTURE ENVIRONMENTS

[75] Inventors: John D. Neuner, Bay Point; Frederick P. Isley, Jr., Tracy, both of Calif.

[73] Assignees: Hexcel Corporation, Pleasanton; Fyfe Co., LLC, San Diego, both of Calif.

[21] Appl. No.: 08/652,834

[22] Filed: May 23, 1996

[51] Int. Cl.⁶ .................................. B32B 7/00; E04C 3/34
[52] U.S. Cl. ........................ 442/175; 442/169; 442/178; 442/179; 442/180
[58] Field of Search ................................ 442/169, 175, 442/178, 179, 180

[56] References Cited

U.S. PATENT DOCUMENTS

| | | | |
|---|---|---|---|
| 3,427,190 | 2/1969 | Murdock | 117/132 |
| 3,891,583 | 6/1975 | Drisko et al. | 260/18 EP |
| 4,195,001 | 3/1980 | Lytton | 260/28 R |
| 4,260,700 | 4/1981 | Cassutt et al. | 525/113 |
| 4,496,611 | 1/1985 | Kawakubo et al. | 427/160 |
| 4,519,856 | 5/1985 | Lazzara | 156/49 |
| 5,030,493 | 7/1991 | Rich | 428/63 |
| 5,218,810 | 6/1993 | Isley, Jr. | 52/725 |

*Primary Examiner*—Helen L. Pezzuto
*Attorney, Agent, or Firm*—Oppenheimer Wolff & Donnelly LLP

[57] ABSTRACT

Reinforcement of structures in high-moisture environments is achieved by applying reinforcement layers which include a fabric portion and an uncured resin portion where the uncured resin contains a moisture curable silicon-modified polyether resin. The uncured reinforcement layer is cured in place about the structure to form a composite reinforcement shell. The uncured reinforcement layer is formed from either dry-woven fabric or woven fabric which is pre-impregnated with a cured resin and then coated with the moisture-curable silicon-modified polyether resin. The invention finds particular use in reinforcing bridge supports and pilings which are at least partially submerged in water. Containment layers are used to prevent de-lamination during curing of the reinforcement structure. Use of a containment layer not only prevents de-lamination caused by waves or other turbulent water, but also enhances the underwater curing process.

10 Claims, 2 Drawing Sheets

REINFORCEMENT OF STRUCTURES IN HIGH MOISTURE ENVIRONMENTS

BACKGROUND OF THE INVENTION

1. Field of the Invention

The present invention relates generally to reinforcing large scale support structures which are present in high moisture environments. More particularly, the present invention involves wrapping a wide variety of structures with composite materials to form reinforcement shells which are specially designed to provide structural reinforcement both in and out of water.

2. Description of Related Art

Concrete columns are widely used as support structures. Bridge supports, freeway overpass supports, building structural supports and parking structure supports are just a few of the many uses for concrete columns. Concrete columns exist in a wide variety of shapes. Concrete columns with circular, square and rectangular cross-sections are most common. However, numerous other cross-sectional shapes have been used including regular polygonal shapes and irregular cross-sections. The size of concrete columns also varies greatly depending upon the intended use. Concrete columns with diameters on the order of 2 to 20 feet and lengths of well over 50 feet are commonly used as bridge or overpass supports.

It is common practice to reinforce concrete columns with metal rods or bars. The metal reinforcement provides a great deal of added structural strength to the concrete column. Although metal reinforcement of concrete columns provides adequate structural reinforcement under most circumstances, there have been numerous incidents of structural failure of metal-reinforced concrete columns when subjected to asymmetric loads generated during earthquakes. The structural failure of a metal reinforced concrete support column during an earthquake can have disastrous consequences. Accordingly, there is a continuing need to enhance the ability of concrete columns to withstand the asymmetric loads which are applied to the column during an earthquake.

One way of increasing the structural integrity of concrete columns is to include additional metal reinforcement prior to pouring the concrete column. Other design features may be incorporated into the concrete column fabrication in order to increase its resistance to asymmetric loading. However, there are hundreds of thousands of existing concrete supports located in earthquake prone areas which do not have adequate metal reinforcement or structural design to withstand high degrees of asymmetric loading. Accordingly, there has been a concentrated effort to develop systems for reinforcing such existing concrete columns to prevent or reduce the likelihood of failure during an earthquake.

One example of a method for increasing the structural strength of existing concrete structures is set forth in U.S. Pat. No. 4,786,341. In this particular patent, the outer surface of the concrete column is reinforced by wrapping a fiber around the column in a variety of different patterns. A problem with this particular method is the amount of time required to wrap a concrete column with a single fiber is time consuming and expensive.

One approach to reinforcing the exterior of an existing concrete support column is set forth in U.S. Pat. No. 5,043,033. In this patent, the exterior of the concrete column is wrapped with a composite material to form a shell surrounding the concrete column. The space between the outer composite shell and the concrete column is then pressurized by injecting a hardenable liquid.

Another approach, as set forth in U.S. Pat. No. 5,218,810 involves wrapping large columns with composite reinforcement layers to form a reinforcing shell which is in direct contact with the column surface.

Although the above reinforcement procedures are well-suited for reinforcing structures in relatively dry environments, they are not suitable for use where water is present. For example, numerous bridge supports columns include substantial portions which are located underwater. Such underwater columns are present in both fresh water and salt water environments. Accordingly, there is a present need to provide composite type reinforcement methods and systems which can be used under water.

In addition to concrete columns, there are numerous other types of structures present in high moisture environments which require periodic reinforcing. Pier or pilings in both fresh water and salt water are made from many different types of materials, including metal, wood and concrete. These types of structures are subject to continual deterioration from the elements. A method and system which can be used simply and efficiently to rehabilitate these types of structures would be extremely advantageous.

SUMMARY OF THE PRESENT INVENTION

In accordance with the present invention, a method is provided for reinforcing a wide variety of structures which are located underwater or in other high moisture environments. The invention is based on the discovery that composite materials may be used successfully to reinforce structures in high moisture environments provided that certain water curable resins are utilized in the resin matrix of the composite.

The invention involves applying to the surface of the structure at least one uncured reinforcement layer to form an uncured shell surrounding the surface. The uncured reinforcement layer includes a fabric portion and an uncured resin portion. As a feature of the present invention, the uncured resin portion contains a moisture curable silicon modified polyether resin. This type of moisture curable resin was found to be especially well-suited for use in providing high strength reinforcement structures in high moisture environments.

As another feature of the present invention, a containment layer is placed around the uncured reinforcement layer to enhance the curing process in underwater situations or other high moisture environments. The use of stretch wrap as a containment layer is especially useful for support columns and other structures located in river or ocean environments where turbulent water flow or wave action presents unique problems with respect to applying and curing the composite reinforcement.

As a further feature of the present invention, the fabric portion is a prepreg which includes a cured or, at least partially cured, resin matrix. It was found that the use of a prepreg in combination with the uncured silicon modified polyether resin which is applied immediately prior to application at the job site, produces an especially effective reinforcement. The matrix used for the prepreg is one which retains sufficient flexibility and elasticity to allow the prepreg to be wrapped around support columns and other large structures. Resin matrices which include cured silicon modified polyethers were found to be well-suited for use in combination with the uncured silicon modified polyether resins which are applied at the job site.

The above discussed and many other features and attendant advantages of the present invention will become better understood by reference to the following detailed description when taken in conjunction with the accompanying drawings.

DETAILED DESCRIPTION OF THE INVENTION

The present invention has wide application to the reinforcement of large structures which are located either underwater or in a high moisture environment. A high moisture environment is one where the structure is consistently exposed to water or air which is saturated with water. Exemplary structures which may be reinforced include bridge support columns, pilings and pier or platform support structures which are at least partially submerged in either fresh or salt water. These types of structures are typically made from reinforced concrete, wood, metal and combinations thereof.

Figure 1:
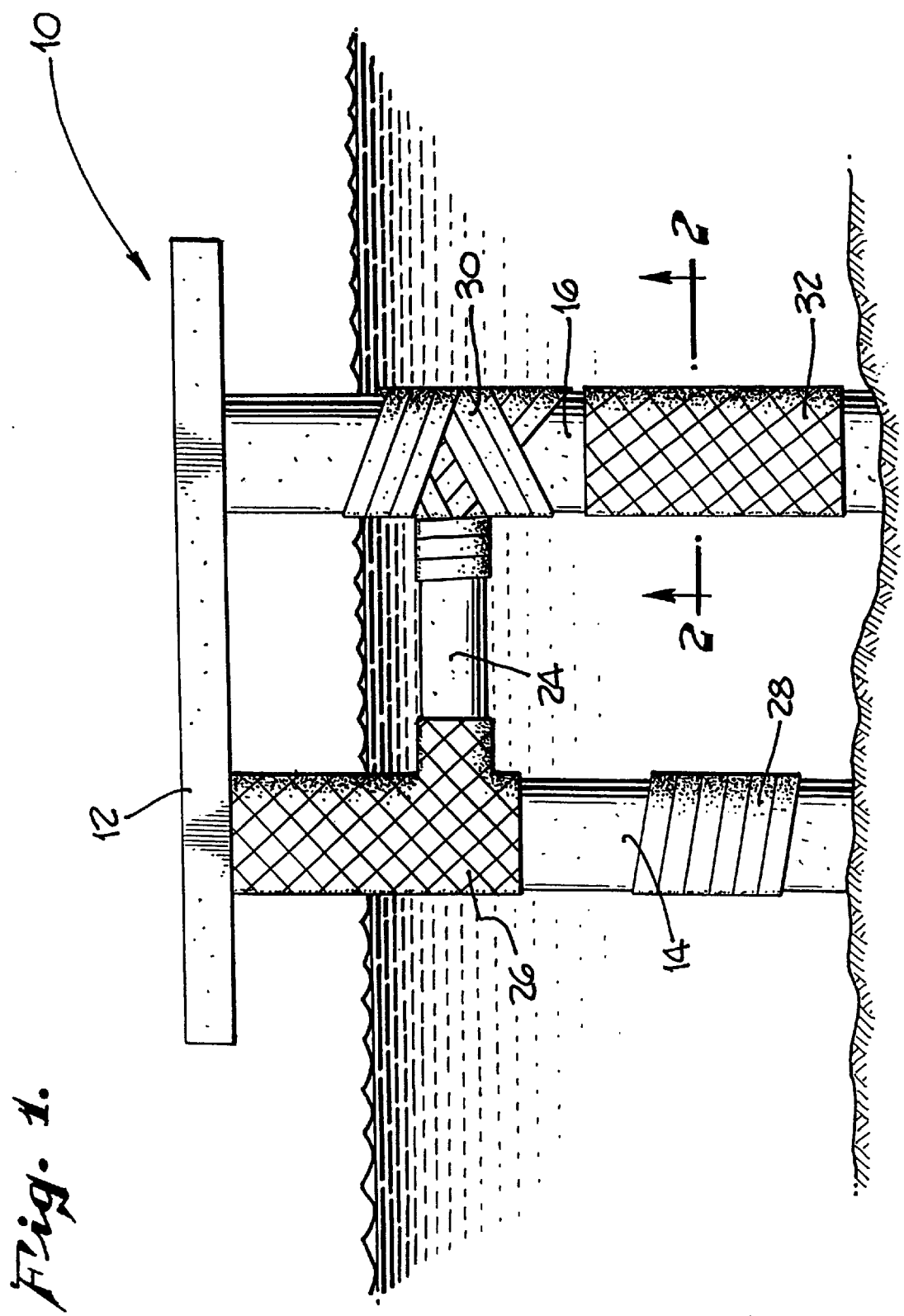
FIG. 1 is a side view of a platform which includes partially submerged support structures which include four exemplary reinforcements in accordance with the present invention.

An exemplary platform which is reinforced in a number of different places is shown generally at 10 in FIG. 1.

The platform 10 includes a deck 12 and supporting columns 14 and 16. Both columns 14 and 16 are anchored to an ocean or lake floor 20 and extend above the lake or ocean surface 22. A cross support beam 24 extends between the support columns 14 and 16. For exemplary purposes, the platform 10 is shown having four different exemplary types of reinforcements at locations 26, 28, 30 and 32.

It will be understood by those skilled in the art that the platform 10 is shown for exemplary purposes only, and that the reinforcement methods and materials described herein with respect to this example may also be used to reinforce large-scale structures in other high-moisture environments.

Figure 2:
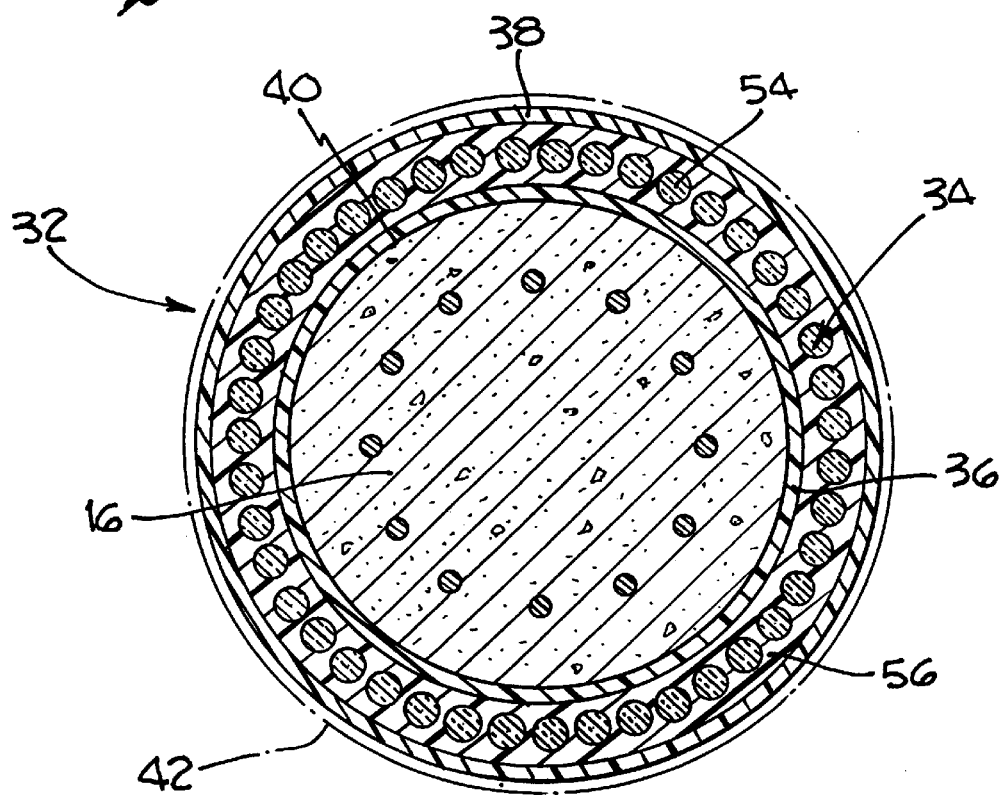
FIG. 2 is a sectional view of one of the reinforcements of FIG. 1 taken in the 2—2 plane.

A cross section of reinforcement structure or shell 32 is shown in FIG. 2. The reinforcement shell includes a reinforcement layer comprising a fabric portion 34 and a resin portion depicted as interior resin layer 36 and exterior resin layer 38. The shell 32 surrounds the surface 40 of column 16. Column 16 in this example is concrete reinforced with steel. However, the column could equally as well be made from wood or metal. The surface 40 of column 16 defines a continuous surface around which the shell 32 has been formed. The reinforcement shell 32 further includes an exterior layer of stretch wrap which is shown in phantom at 42.

Figure 3:
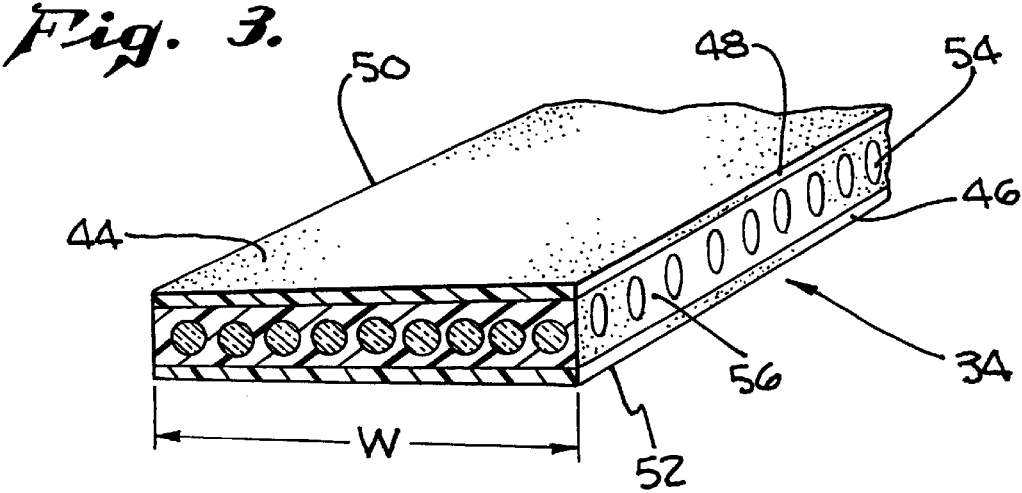
FIG. 3 is a partial schematic view of an exemplary uncured reinforcement layer prior to application to the surface of a support structure.

Referring to FIG. 3, a partial sectional view of the shell is shown when it is in the form of an uncured reinforcement layer prior to application to the column surface 40. This uncured reinforcement layer 44 includes the fabric portion 34 and the uncured resin portion which includes uncured resin layers 46 and 48. Upon curing, the layers 46 and 48 become layers 36 and 38, shown in FIG. 2. The uncured reinforcement layer 44 has two selve edges 50 and 52 as shown in FIGS. 1 and 3. The width of the fabric "W" may be from 3 to 100 inches or more. For shell 32, the width of the fabric is on the order of 4 to 6 feet. Larger sizes become unmanageable at the job site, especially when divers or other personnel must transport the uncured reinforcement layer underwater to the structure being reinforced.

The fabric portion 34 preferably includes a resin impregnated woven fiber mat in which the impregnated resin has been substantially cured. The woven fiber mat may be made from any of the known fiber material commonly used in high strength composite structures. Exemplary fibers include glass, polyaramid, graphite, silica, quartz, carbon, ceramic and polyethylene. Preferably, the fibers in the woven mat will extend at a plus bias angle of between about +20° to +70° relative to the selve edges and a minus bias angle of between about −20° to −70° relative to the selve edges. Alternatively, the fibers in the woven mat may include warp yarns which extend substantially parallel to the selve edges, and fill yarns which extend substantially perpendicular to the warp yarns. The diameter of the fibers used in the woven fiber mat preferably range from about 3 microns to about 30 microns. It is preferred that the fibers be bundled into yarns which include between about 200 to 8,000 fibers. The fabric is preferably a plain woven fabric, but may also be a 2 to 8 harness satin weave. The number of warp yarns per inch is preferably between about 40 to 60. The preferred number of fill yarns per inch is preferably between about 40 and 60. The particular weave pattern and orientation of fibers may be varied depending upon the particular structure being reinforced.

The invention is particularly well-suited for reinforcing large columns or pilings which have diameters on the order of 1 to 15 feet and which have lengths on the order of 10 to 50 feet or higher. The invention may also be used to reinforce beam connectors in the some manner as set forth in co-pending patent application Ser. No. 08/496,743 filed Jun. 29, 1995.

The woven fiber mat is shown schematically at 54 in FIGS. 2 and 3. The precured resin matrix is shown at 56. The precured resin matrix is preferably a silicon-modified polyether resin or an epoxy resin. However, any thermoset resin will work that has sufficient polarity to bond to an epoxy, e.g. acrylic, urethane, phenolic or a polyester. A thermoplastic coated fabric will also work if it has sufficient polarity to bond to an epoxy, e.g. acrylic, nylon, ionomer, urethane, polyester, polysulfone, silicone or styrene-acrylonitrile. Preferred precured resin matrices are those where the resulting coated fabric is sufficiently flexible to allow it to be wrapped around column 16or other support structure. It is preferred that a combination of silicon-modified polyether resin and epoxy resin be utilized. Exemplary silicon-modified polyethers are those available from Kaneka Corporation (Japan) which are identified as SAT 010, 030 and 200. SAT200 is the standard grade. Other silicon-modified polyethers may be utilized provided that they are compatible with epoxy resins and exhibit high composite tensile strength. The characteristics of suitable silicon-modified polyethers which may be used in accordance with the present invention are set forth in Table A.

TABLE A

Properties Of Uncured Silicon-Modified Polyether

| Grade | SAT200 | SAT030 | SAT010 |
|---|---|---|---|
| Appearance | light yellow, transparent liquid | | |
| Viscosity (Pa · s 23° C.) | 20~32 | 2.0~6.0 | 0.2~1.0 |
| (poise 23° C.) | 200~320 | 20~60 | 2~10 |
| Color (Gardner) | 3 & below | | |
| Specific gravity at 20° C. | 1.00 ± 0.02 | | |
| pH (H$_2$O/iso-PrOH) | 6.0~8.0 | | |
| Water content (wt % KF method) | 0.1 & below | | |

Although any number of different resins may be used as a precured matrix 56, it is preferred that combinations of silicon-modified polyether resin with bisphenyl A epoxy resin be used. Exemplary compositions will include from 80 to 120 parts by weight standard grade Kaneka silyl SAT resin (SAT200) combined with from 40 to 80 parts by weight bisphenyl A epoxy resin. Hydrogenated bisphenyl A epoxy resins are preferred because of their enhanced UV stability. In addition to the two resins, additional exemplary ingredients for the pre-preg resin include from 1 to 5 parts by weight amino silane. Exemplary amino silanes are those available from OSI Chemical Specialties under the designation A1120.

Another preferred ingredient is from 2 to 10 parts by weight tris (dimethylaminoerthyl) phenol which is available from Air Products as Anchamine K54. From 10 to 30 parts by weight titanium dioxide is also preferably included as a filler as well as from 1 to 5 parts by weight tin carboxylate salt. Acetone or other suitable selvent is preferably included in amounts ranging from 100 to 200 parts by weight. Water is added in amounts ranging from 1 to 5 parts by weight. The water functions as a catalyst or curing agent. Accordingly, the amount of water is varied in order to either extend or reduce the curing time of the resin. In some instances, it may be desirable to reduce the selvent (i.e. acetone) content to a relatively small level, on the order of 1 to 50 parts by weight, in order to reduce pollution problems associated with removal of the acetone during the curing process. An exemplary resin formulation is set forth in Example 1.

Although it is preferred that the fabric portion 34 include a cured pre-preg resin, it is also contemplated within the scope of the present invention that the fabric portion 34 be "dry" fabric which is devoid of resin matrix. The use of a precured resin was found to provide increased structural strength and reinforcement. Accordingly, the use of a fabric portion 34 which includes a precured resin as described above is preferred. Once the woven mat is impregnated with resin, it is heat cured. Curing times will vary depending upon the tower temperature. Times of 6–10 minutes at 25°–35° F. are usually sufficient. As is well known, silicon-modified polyether resins are water cured, i.e. water acts as the curing agent or catalyst. Heat accelerates the cure and is used to cure the epoxy part of the formulation. After curing, the fabric portion, including the woven mat and cured resin matrix, may be stored or shipped immediately to the job site for use.

At the job site, additional uncured resin is applied to the fabric portion 34. The uncured resin is applied to the fabric portion either by dipping, spraying or other conventional application procedure. Preferably, the uncured resin will form layers of uncured resin on both sides of the fabric portion 34 as shown at 44 and 46 in FIG. 3. It is preferred that the fabric portion 34 be coated on both sides with uncured resin. However, in some instances, it may be desirable to coat only one side of the fabric portion with resin.

The resin which is applied at the job site includes as a substantial ingredient a silicon-modified polyether. Substantial means at least 25 percent by weight of the total resin. The silicon-modified polyether may be selected from the same SAT series of silicon-modified polyethers which were used in preparing the pre-preg resin. Preferably, silicon-modified polyether used for the on-site resin will be the same as the resin used in preparing the fabric portion. The use of silicon-modified polyether as the on-site resin provides important advantages for the present invention. For example, at many job sites, the outside air temperature will be well above the water temperature. This produces a dilemma in that conventionally catalyzed resins require the addition of extra catalysts in order to achieve adequate curing at the lower water temperature which may be on the order of slightly above freezing to 50° F. However, addition of the extra catalyst results in the potential for unacceptably fast curing rates and potential overheating when the catalyst is added to resin mixtures in bulk which are initially exposed to much higher ambient temperatures. By using a water curable resin, such as silicon-modified polyethers, overheating of the resin is not a problem since curing does not begin to any substantial degree until the resin is immersed or otherwise exposed to water. Accordingly, the present invention is particularly well-suited for reinforcing and repairing structures which are located in areas where the temperature difference between an ocean or lake and the ambient outside temperature is large, i.e. on the order of 5° C. or more.

Although the uncured resin which is applied to the fiber portion 34 at the job site may consist principally of a silicon-modified polyether, such as SAT200, it is preferred that the resin be a "two part" resin which includes both silicon-modified polyether and a hydrogenated bisphenyl A epoxy resin. The compositions of suitable two-part epoxy resins for use in on-site application to the fabric portion 34 are set forth in Table B, Table C and Table D.

TABLE B

On-Site Resins

| | | Parts by* Weight |
|---|---|---|
| PART A | Silicon Modified Polyether (SAT200 or equivalent) | 80–120 |
| | Aminosilane (A1120 or equivalent) | 1–5 |
| | Tris (dimethylaminoerthyl) phenol (Anachem K54 or equivalent) | 5–15 |
| PART B | Hydrogenated Bisphenol A epoxy resin (Eponex 1510 or equivalent) | 150–250 |
| | Fumed silica (Cabot TS720 or equivalent) | 1–5 |
| | Tin Carboxylate Salt (UC38 or equivalent) | 1–5 |
| | Titaniuim Dioxide | 0.1–1.0 |

*Mix Ratio (A/B) = 1/1–5/1

TABLE C

Resin 35/192/1

| | | Parts by Weight |
|---|---|---|
| PART A | SAT 200 | 100 |
| | A1120 | 2.5 |
| | Anchamine K54 | 5 |
| PART B | Eponex 1510 | 62.4 |
| | UL38 | 2.0 |
| | titanium dioxide | 5.5 |
| | Cab-O-Sil TS720 | 2.5 |
| | water | .6 |

TABLE D

Resin 35/147/3

| | | Parts by Weight |
|---|---|---|
| PART A | SAT 200 | 100 |
| | A1120 | 1.2 |
| | Anchamine K54 | 8 |
| PART B | Epon 828 | 100 |
| | Cab-O-Sil TS720 | 3.2 |
| | UL 38 | .65 |

Part A and B of the on-site resin may be stored separately indefinitely. A small amount of water is included in the Part B resin to insure that those parts of the on-site resin which are not immersed in water will also cure. This situation arises, for example, in FIG. 1 where a portion of the reinforcing shell is located below the water level, and a portion is located above. Initially, the portion of the reinforcement shell located above the water line may not be exposed to sufficient water to insure complete curing. Accordingly, the water present in Part B takes this situation into account. Once the on-site resin has been applied to the fabric portion 34, the resulting uncured reinforcement layer is wrapped around the column to form an uncured shell. The length of the uncured reinforcement layer is selected to insure that at least one complete wrapping is achieved. If desired, the length of the uncured reinforcement layer can be selected to achieve multiple wrappings with the resultant multiple layers. In addition, if desired, the initial uncured reinforcement layer can be a multiple-layered configuration which provides for supplying multiple layers with one wrapping of the column.

Once the uncured reinforcement layer has been wrapped around the column 16, stretch wrap or other similar thin wrapping layer is wrapped over the uncured shell to hold it in place. The stretch wrap wrapping is shown in FIG. 2 as phantom layer 42. The stretch wrap is shown in phantom since it may be removed after final curing or, alternatively, it may be left in place. Any of the commonly used stretch wrap materials may be used to provide the containment layer 42. Stretch wrap is a polymer film which is widely used and readily available from any number of commercial sources. For example, stretch wrap is available from Mobil Oil Corporation under the tradenames MOBILWRAP or MOBIL MASTERWRAP. The wrap is also sold by Borden Chemical Co. under the tradename BORDEN HANDWRAP, and is also available from Uline (Los Angeles, Calif.) under the tradename ULINE ECONO-WRAPPER. Guages 80–120.

Use of the stretch wrap is particularly preferred in situations where the column 16 is subjected to turbulence. For example, the use of a stretch wrap containment layer 42 is particularly preferred where reinforcing columns are located in areas where wave action or other strong ocean currents are present. Additionally, the use of stretch wrap is preferred in rivers where fast flowing and/or turbulent water may be present. Referring again to FIG. 1, three additional exemplary reinforcements utilizing the composite shells in accordance with the present invention are shown at 26, 28 and 30. Reinforcement 28 is exemplary of the type of reinforcements where the uncured reinforcement layer is wound spirally around column 14. In this type of spiral reinforcement system, the width of the uncured reinforcement layer will range from a few inches to 2 to 3 feet. This type of spiral wrap reinforcement configuration is well-suited for situations where the use of wider fiber matting is not possible. Such situations may occur where only one diver is available or underwater conditions make it difficult to apply relatively wide reinforcement layers to the column or other support structure. When spiral wrapping, as depicted at 28, is used, it is particularly preferred that a final outer layer of stretch wrap be applied to contain the spirally-wrapped reinforcement.

The reinforcement 26 shown in FIG. 1 is similar to the reinforcement shell 32 except that provision is made for extending the reinforcing shell onto horizontal structural beam 24. In addition, the reinforcement shell 26 extends above the water surface 22 and is further adhered to the bottom of deck 12 as shown at 60 and 62. As previously mentioned, Part B of the two-part on-site resin will include a small amount of water to insure that the portion of composite shell 26, which is located out of the water, will cure properly.

A fourth exemplary composite reinforcement is shown at 30. This is also an example of using uncured reinforcement layers in accordance with the present invention to form a spirally-wrapped reinforcement. The reinforcement 30 is based upon the same spiral wrapping principle as reinforcement 28, except that it has been adapted to provide reinforcement of the attachment between vertical column 16 and horizontal beam 24. The spiral wrapping shown in reinforcement 30 is partially schematic and exemplary only. Those of ordinary skill in the art will recognize that any number of spiral wrapping orientations are possible in order to achieve reinforcement of the joint between beam 24 and column 16. For example, a typical wrapping of a column will not involve spiral wrapping. Instead, the fabric will be wrapped around the column in a direction perpendicular to the column axis. The next fabric layer is butt spliced against the first wrapping layer. Additional vertically butt-jointed layers are added, as necessary, to cover the entire column (e.g. see U.S. Pat. No. 5,218,810). In addition, the onsite resin may be applied to the structure prior to reinforcement to act as a primer. Also, the onsite resin may be applied as a cosmetic coating over the exterior of the reinforcement once it has been applied to the structure.

Examples of practice are as follows:

EXAMPLE 1

Woven Fiber Water With Cured Resin

In this example, reinforcing composite shells in accordance with the present invention are formed and tested. The composite shells include a fabric portion which is made up of cured resin impregnated fiberglass woven mat. The fiber glass woven mat is a bidirectional E-glass fabric having an aerial weight of about 13.5 oz/square yard. A composite is formed by impregnating the glass fabric with silicon modified polyether/epoxy resin. The specific resin used for this example had the following composition:

TABLE 1

| Exemplary Precured Resin | |
|---|---|
| Ingredient | Parts By Weight |
| SAT200 | 100 |
| A1120 | 2.5 |
| Anchamine K54 | 5 |
| Eponex 1510 | 62.3 |
| UC38 | 2.0 |
| Titanium dioxide | 22 |
| Water | 2.0 |
| Acetone | 142.2 |

SAT200 is a silicon modified polyether available from Kaneka Corp., Japan
A1120 is an aminosilane available from OSi Chemical Specialties (Danbury, CT)
Anchamine K54 is tris (dimethylaminoerthyl) phenol available from Air Prodcuts (Allentown, PA)
Eponex 1510 is hydogenated bisphenol A epoxy resin available from Shell Chemical (Houston, Texas)
UC 38 is a tin carboxylate salt available from Witko (New York, NY)
Titanium dioxide is T-Pure grade available from DuPont (Wilmington, Delaware)

The resin was prepared by mixing the various ingredients together at room temperature. The one part resin was applied to the E-glass mat by dipping the mat in the resin in an impregnating tower which was maintained at a temperature of 250° F. Exposure times were 10 minutes. At this high temperature, the acetone was flashed off and the resin was cured to form a rubbery tack free composite which included the woven fiber mat and cured resin.

The rubbery composite was then dipped into a second resin which was a two-part resin which had the following composition:

TABLE 2

Exemplary On-Site Resin

|  | Ingredient | Parts By Weight |
|---|---|---|
| PART A | SAT200 | 100 |
|  | A1120 | 2.5 |
|  | Anchamine K54 | 10 |
| PART B | Eponex 1510 | 187 |
|  | TS720 | 2.5 |
|  | UC38 | 2.0 |
|  | Titanum dioxide | 9.4 |
|  | Water | .6 |

TS720 is a hydrophobic grade of fumed silica from Cabot Corp (Tuscola, IL). The total weight of part A is 112.5 and of part B is 201.4. This was the mix ratio used. This resin will cure in air since it contains already some water (there is also sufficient moisture in air to gradually cure it) as well as curing in water since the SAT200 is water activated. A hydrogenated epoxy is used for UV stability since the reinforcement will many times be exposed to UV radiation.

Exemplary reinforcement shells or rings were made by wrapping 53 by 5 inch pieces of the precoated fabric portion (coated with the second resin) around a 6⅝ inch diameter PVC pipe. Approximately 120 grams of this resin was used. This gave approximately 2½ layers around the pipe. After curing under various conditions, the shells were sectioned into 1 inch wide rings and tested for tensile strength with a split ring test fixture. The results of the tests were as follows:

TABLE 3

Ring Test Results

| Ring No. | Cure Conditions | Temperature of Test | Tensile Strength |
|---|---|---|---|
| 1 | 4 weeks at room temperature, Dry | Room temperature | 25.7 |
| 2 | 4 weeks in fresh water at 42° F. | 32–40° F. | 33.3 |
| 3 | 4 weeks in salt water at 43° F. | 32–40° F. | 31.6 |

As can be seen from this example, the composite shell found by underwater curing in accordance with the present invention was stronger than the air cured shell.

EXAMPLE 2

In this example, reinforcement shells were prepared where the two-part resin was applied to dry E-glass fabric. The E-glass was not pre-impregnated with the one port silicon modified polyether/epoxy resin. Instead, a 53 by 5 inch piece of E-glass fabric was cut and placed on a flat surface. 150 grams of resin is prepared and half is poured out on to the fabric and squeegied on. The fabric is turned over and the rest of the resin is poured out and squeegied on this side. The impregnated fabric was then either directly rolled on to 9 inch long sections of PVC pipe in air or the prepreg was placed in a tank of saltwater and then rolled up. In each case, stretch wrap tape was then wrapped around the prepreg on the roll along with a few rubberbands to hold everything together. Stretch wrap tape is the well-known thermoplastic material which is in common use to wrap objects and to fasten objects on pallets, etc. It does not degrade in water to any appreciable extent. The resulting structures were then either allowed to cure in air or allowed to cured in saltwater.

The resulting cured reinforcement shells were sectioned into rings and tested in the same manner as Example 1. The results were as follows:

TABLE 4

Ring Test Results

| Ring No. | Cure Conditions | Temperature of Test | Tensile Strength |
|---|---|---|---|
| 4 | 4 weeks at room temperature, Dry | Room temperature | 27.5 |
| 5 | 4 weeks at 43° F. under saltwater | Room temperature | 18.6 |

A comparison sample was also prepared in which a room temperature dry-cure conventional epoxy resin was substituted for the silicon modified polyether/epoxy two-part resin. The shell was cured for 4 weeks under dry conditions at room temperature. The tensile strength of the sectioned ring was 27.1 ksi when measured at room temperature.

As can be seen from these results, the failure to use a pre-preg fabric portion results in lower tensile strength of the shell when it is cured underwater. Accordingly, use of pre-impregnated and cured resin/fiber mats as set forth in Example 1 is preferred.

EXAMPLE 3

Additional Exemplary Pre-Coat Resins

The following two-part resin compositions are suitable for use in place of the one-part resin used in Example 1 make the precured mat

TABLE 5

|  | Ingredient | Parts By Weight |
|---|---|---|
| A) | Epon 828 | 100 |
|  | Jeffamine D400 | 40 |
|  | Jeffamine D2000 | 69.1 |
|  | nonylphenol | 30 |
|  | acetone | 3177 |

Shell's Epon 828 epoxy is the diglycidyl ether of bisphenol A available from Shell Oil Company (Houston, Texas)
Other brands of diglycidyl ether of bisphenol A which can be used are Dow DEN 331 (Dow Corning, Midland, MI) or Ciba Araldite 6010 (Ciba Geigy, Hawthorne, NY)
Jeffamine D400 and D2000 are polyoxyprpeneamines that can be obtained from Huntsman Chemical Company (Port Neches, TX)
nonylphenyl is an accelerator
acetone is a solvent

|  | Ingredient | Parts By Weight |
|---|---|---|
| B) | Epon 828 | 100 |
|  | Jeffamine D400 | 50 |
|  | Jeffamine D2000 | 18 |
|  | nonylphenol | 30 |
|  | acetone | 792 |

Prepreg Resin A would have a slightly lower modulus after cure than Resin B and both would be less expensive than the prepreg resin used in Example 1. All three resins would be suitable on graphite fabrics as well as glass fabrics. Also, anyone skilled in the art could remove the acetone in the above, use less accelerator nonylphenol and make a solventless or hot melt resin and pass this through the impregnating towers to cure. This would avoid acetone vapor removal which has become a major concern due to environmental laws which prevent dumping of acetone directly into the atmosphere.
Resin contents in all cases with glass and graphite would be in the 1–20% by weight range. Exposure times were 10 minutes at 330° F.

Although the pre-coating or prepreg resin may be varied as set forth in this example, it should be noted that the two-part on-site application resin still requires the use of a silicon modified polyether resin.

EXAMPLE 4

An additional exemplary two-part resin for application at the site of the structural repair/reinforcement has the following composition:

TABLE 5

|        | Ingredient      | Parts By Weight |
|--------|-----------------|-----------------|
| Part A | SAT10           | 100             |
|        | KBM 602         | 3               |
|        | Anchamine K54   | 15              |
|        | Jeffamine D400  | 3               |
|        | Cab-O-Sil TS720 | 4               |
|        |                 | Total = 125     |
| Part B | Eponex 1510     | 177             |
|        | ERL 0500        | 10              |
|        | distilled water | .6              |
|        | Cab-O-Sil TS720 | 9.3             |
|        | titanium dioxide| 9.5             |
|        | Catalyst A      | .5              |
|        |                 | Total = 206.9   |

Mix in the above in each part with stirring and store separately in sealed containers.
SAT10 is a silicon modified polyether available from Kaneka Corp. (Japan). It gives higher cross linking than SAT200
KBM 602 is 3-(2 aminoethylaminopropyl) dimethoxymethylsilane available from SHIN-ETSU (Japan)
ERL 0500 is a trifunctinal epoxy resin from Ciba Geigy (Hawthorne, NY)
Catalyst A is a mixture of dibutyltin didodecanoate, diisodecyl phthalate and 2,6 di tert butyl-p-cresol (Kaneka Corp., Japan)
When ready to use at the site, mix 125 pts by weight A to 206.9 pts by weight B. This resin gives a longer pot life and higher modulus than the two-part resin set forth in Example 1.

Having thus described exemplary embodiments of the present invention, it should be noted by those skilled in the art that the disclosures herein are exemplary only and that various other alternations, adaptations and modifications may be made within the scope of the present invention. Accordingly, the present invention is not limited to the specific embodiments as illustrated herein.

What is claimed is:

1. A method for reinforcing structures which are located in high moisture environments wherein said structure comprises at least one continuous exterior surface which is exposed to moisture, said method comprising the steps of:

applying to said continuous surface, in the presence of said moisture, at least one uncured reinforcement layer to form an uncured shell surrounding said continuous exterior surface, said reinforcement layer comprising a fabric portion and an uncured resin portion, said uncured resin portion comprising a moisture curable silicon modified polyether resin; and curing said uncured resin in the presence of said moisture to form a composite shell for reinforcing said structure.

2. A method for reinforcing structures in high moisture environments according to claim 1 which includes the additional step of placing a containment layer around said uncured shell prior to curing thereof.

3. A method for reinforcing structures in high moisture environments according to claim 2 wherein said containment layer is stretch wrap.

4. A method for reinforcing structures in high moisture environments according to claim 1 wherein said fabric portion comprises a woven fiber mat wherein said fiber is selected from the group consisting of glass, polyaramid, graphite, silica, quartz, carbon, ceramic and polyethylene.

5. A method for reinforcing structures in high moisture environments according to claim 1 wherein said fabric portion comprises a woven fiber mat and a cured resin, said cured resin being prepared from one or more resins selected from the group consisting of silicon modified polyether, epoxy, acrylic, urethane, polyester, polysulfone, silicone and styrene-acrylonitrile.

6. A method for reinforcing structures in high moisture environments according to claim 5 wherein said resin comprises a mixture of silicon modified polyether and epoxy resins.

7. A method for reinforcing structures in high moisture environments according to claim 1 wherein said uncured resin portion further comprises an epoxy resin.

8. A method for reinforcing structures in high moisture environments according to claim 5 wherein said uncured resin portion further comprises an epoxy resin.

9. A method for reinforcing structures in high moisture environments according to claim 1 wherein at least a portion of said continuous surface is submerged in water.

10. A method for reinforcing structures in high moisture environments according to claim 1 wherein said structure is a support column having a bottom portion submerged in water and a top portion which is connected to an elevated structure which is supported by said column.

* * * * *